Feb. 14, 1928.

J. A. SUAREZ

FISHING MACHINE

Filed March 22, 1927

1,659,413

INVENTOR
José A. Suarez
BY
ATTORNEY

Patented Feb. 14, 1928.

1,659,413

UNITED STATES PATENT OFFICE.

JOSÉ A. SUAREZ, OF NEW YORK, N. Y.

FISHING MACHINE.

Application filed March 22, 1927. Serial No. 177,429.

This invention relates generally to devices for catching fish, and has more particular reference to a novel type of device adapted for insertion in a stream.

The invention has for an object the provision of an improved device for catching fish which will operate efficiently, and which can be manufactured and sold at a low cost.

For further comprehension of the invention, and of the objects and advantages thereof, reference will be had to the following description and accompanying drawing, and to the appended claims in which the various novel features of the invention are more particularly set forth.

Referring to the drawing forming a material part of this disclosure:

Fig. 1 is a plan view of a stream of water with the invention device applied thereto.

Fig. 2 is a longitudinal vertical sectional view taken on the line 2—2 of Fig. 1.

Fig. 3 is a transverse vertical sectional view taken on the line 3—3 of Fig. 2.

The reference numeral 10 indicates a stream of water, in the bottom of which a pair of posts 11 are supported. The posts are formed near their upper ends with elongated apertures 12, and tapped apertures 13 which communicate with the apertures 12. Threadedly engaging the apertures 13 are rods 14 provided at their upper ends with hand wheels 15, and at their lower ends with flanges 16. The flanges 16 rotatably engage in the tops of slides 17 slidable in the apertures 12. Transversely threadedly engaged in the slides 17 are pointed screws 18 provided with suitable locking nuts 19. Pivotally supported between the pointed screws 18 is a shaft 20 carrying a hub 21 formed with diametrically opposite spokes 22, and other diametrically opposite spokes 23. Fixed to the outer ends of spokes 23 are paddle elements 24, and to the outer ends of spokes 22, baskets 25 formed with chutes 26 extending inwardly towards the shaft 20. Pivotally mounted to the tops of the baskets 25 are covers 27 provided with coil springs 28 coaxial with the cover pivots and normally urging the covers into closed position. Rigidly projecting from the covers are fingers 29 engageable against a pin 30 projecting from post 31 supported in the bottom of the stream 10. Other posts 32 project from the stream bottom and are so arranged that netting 33 stretched between the posts converge towards the baskets 25.

Adjacent the hub 21, and in the line of discharge of the chute 26, is a hopper 34 supported on the shaft 20. The hopper 34 is formed near the bottom with slots 35 engaged by pins 36 at the top of a collection basket 37 resting on the bottom of the stream 10. The sides of baskets 25 are formed of net material, while the bottoms 25' are made from paddle material.

The stream of water 10, implunging upon the paddles 24, 25' causes a rotation of the baskets 25 around shaft 20 as an axis, and as the baskets 25 enter the water of the stream pin 30 engages finger 29 for a certain length of time, opening the cover 27 against the closing action of spring 28. The nets 33 direct the fish 40 towards the basket, and as the baskets rotate and reach the upper position, the fish are discharged through the chutes 26 into the basket 37, from which they may be removed as desired.

While I have illustrated and described my invention with some degree of particularity, I realize that in practice various alterations therein may be made. I therefore reserve the right and privilege of changing the form of the details of construction or otherwise altering the arrangement of the correlated parts without departing from the spirit or the scope of the appended claims.

Having thus described my invention, what I claim as new and desire to secure by United States Letters Patent is:

1. A fish catching device, comprising posts suitably supported, a shaft rotatably mounted therebetween, a hub fixed on the shaft, spokes projecting from the hub, paddles on certain of the spokes, baskets fixed on the other of the said spokes, chutes formed on the side of said baskets, covers hingedly connected to the tops of said baskets, means for normally urging said covers closed, means for opening the covers for a short period of time when the baskets are near their lowermost position, means for directing fish to the baskets when the covers are opened, a hopper supported on said shaft, adjacent said hub, and in the line of discharge of the said chutes, and a collection basket connected with said hopper.

2. A fish catching device, comprising posts suitably supported, a shaft rotatably mounted therebetween, and adjustable longitudinally of the posts, a hub fixed on the shaft, spokes projecting from the hub, paddles on certain of the spokes, baskets fixed on the other of the said spokes, chutes formed on the side of said baskets, covers hingedly connected to the tops of said baskets, means for normally urging said covers closed, means for opening the covers for a short period of time when the baskets are near their lowermost position, means for directing fish to the baskets when the covers are opened, a hopper supported on said shaft, adjacent said hub, and in the line of discharge of the said chutes, and a collection basket connected with said hopper.

3. A fish catching device, comprising posts suitably supported, said posts being formed near their upper ends with elongated apertures, said posts also being formed with tapped apertures, communicating with said apertures rods threadedly engaged in said tapped apertures, hand wheels on the upper ends of said rods, flanges on the lower ends of said rods, slides in said apertures, the flanges being rotatably engaged in said slides, pointed screws threadedly and transversely engaged in said slides, a shaft rotatably supported between said pointed screws, a hub fixed on the shaft, spokes projecting from the hub, paddles on certain of the spokes, baskets fixed on the other of the said spokes, chutes formed on the side of said baskets, covers hingedly connected to the tops of said baskets, means for normally urging said covers closed, means for opening the covers for a short period of time when the baskets are near their lowermost position, means for directing fish to the baskets when the covers are opened, a hopper supported on said shaft, adjacent said hub, and in the line of discharge of the said chutes, and a collection basket connected with said hopper.

4. A fish catching device, comprising posts suitably supported, said posts being formed near their upper ends with elongated apertures, said posts also being formed with tapped apertures, communicating with said apertures rods threadedly engaged in said tapped apertures, hand wheels on the upper ends of said rods, flanges on the lower ends of said rods, slides in said apertures, the flanges being rotatably engaged in said slides, pointed screws threadedly and transversely engaged in said slides, means for locking said pointed screws in adjusted positions, a shaft rotatably supported between said pointed screws, a hub fixed on the shaft, spokes projecting from the hub, paddles on certain of the spokes, baskets fixed on the other of the said spokes, chutes formed on the side of said baskets, covers hingedly connected to the tops of said baskets, means for normally urging said covers closed, means for opening the covers for a short period of time when the baskets are near their lowermost position, means for directing fish to the baskets when the covers are opened, a hopper supported on said shaft, adjacent said hub, and in the line of discharge of the said chutes, and a collection basket connected with said hopper.

5. A fish catching device, comprising posts suitably supported, said posts being formed near their upper ends with elongated apertures, said posts also being formed with tapped apertures, communicating with said apertures rods threadedly engaged in said tapped apertures, hand wheels on the upper ends of said rods, flanges on the lower ends of said rods, slides in said apertures, the flanges being rotatably engaged in said slides, pointed screws threadedly and transversely engaged in said slides, a shaft rotatably supported between said pointed screws, a hub fixed on the shaft, spokes projecting from the hub, paddles on certain of the spokes, baskets fixed on the other of the said spokes, chutes formed on the side of said baskets, covers hingedly connected to the tops of said baskets, means for normally urging said covers closed, said means comprising coil springs coaxial with the cover pivots, and acting between the cover and the basket, means for opening the covers for a short period of time when the baskets are near their lowermost position, means for directing fish to the baskets when the covers are opened, a hopper supported on said shaft, adjacent said hub, and in the line of discharge of the said chutes, and a collection basket connected with said hopper.

In testimony whereof I have affixed my signature.

JOSÉ A. SUAREZ.